United States Patent

Cole

[11] 4,342,153
[45] Aug. 3, 1982

[54] PITCH DIAMETER GAUGE FOR A VARIABLE SPEED PULLEY

[75] Inventor: Saxon Cole, Webster Grove, Mo.

[73] Assignee: American Air Filter Company, Inc., Louisville, Ky.

[21] Appl. No.: 179,255

[22] Filed: Aug. 18, 1980

[51] Int. Cl.³ .......................... G01B 5/18; G01B 5/24
[52] U.S. Cl. ................................. 33/169 B; 33/174 E
[58] Field of Search ............. 33/174 E, 169 B, 169 R

[56] References Cited

U.S. PATENT DOCUMENTS

| | | | |
|---|---|---|---|
| 1,248,340 | 11/1917 | Kinney | 33/169 B |
| 1,379,347 | 5/1921 | Klath | 33/169 B |
| 1,638,887 | 8/1927 | Sirokman | 33/169 B |
| 2,179,658 | 11/1939 | Gallagher | 33/169 B |
| 2,654,156 | 10/1953 | Boyer | 33/169 B |

FOREIGN PATENT DOCUMENTS 2056069 3/1981 United Kingdom ............. 33/169 R

Primary Examiner—Willis Little
Attorney, Agent, or Firm—Thomas G. Anderson

[57] ABSTRACT

A gauge for measuring the pitch diameter of a variable speed V-belt pulley including a body member which can be engaged on the rim of the pulley, a sliding gauge bar carried by the member projecting into the groove of the pulley to engage the tapered walls of the groove of the pulley, and a scale on the gauge bar readable against indicia on the member to express the pitch diameter of the pulley.

6 Claims, 5 Drawing Figures

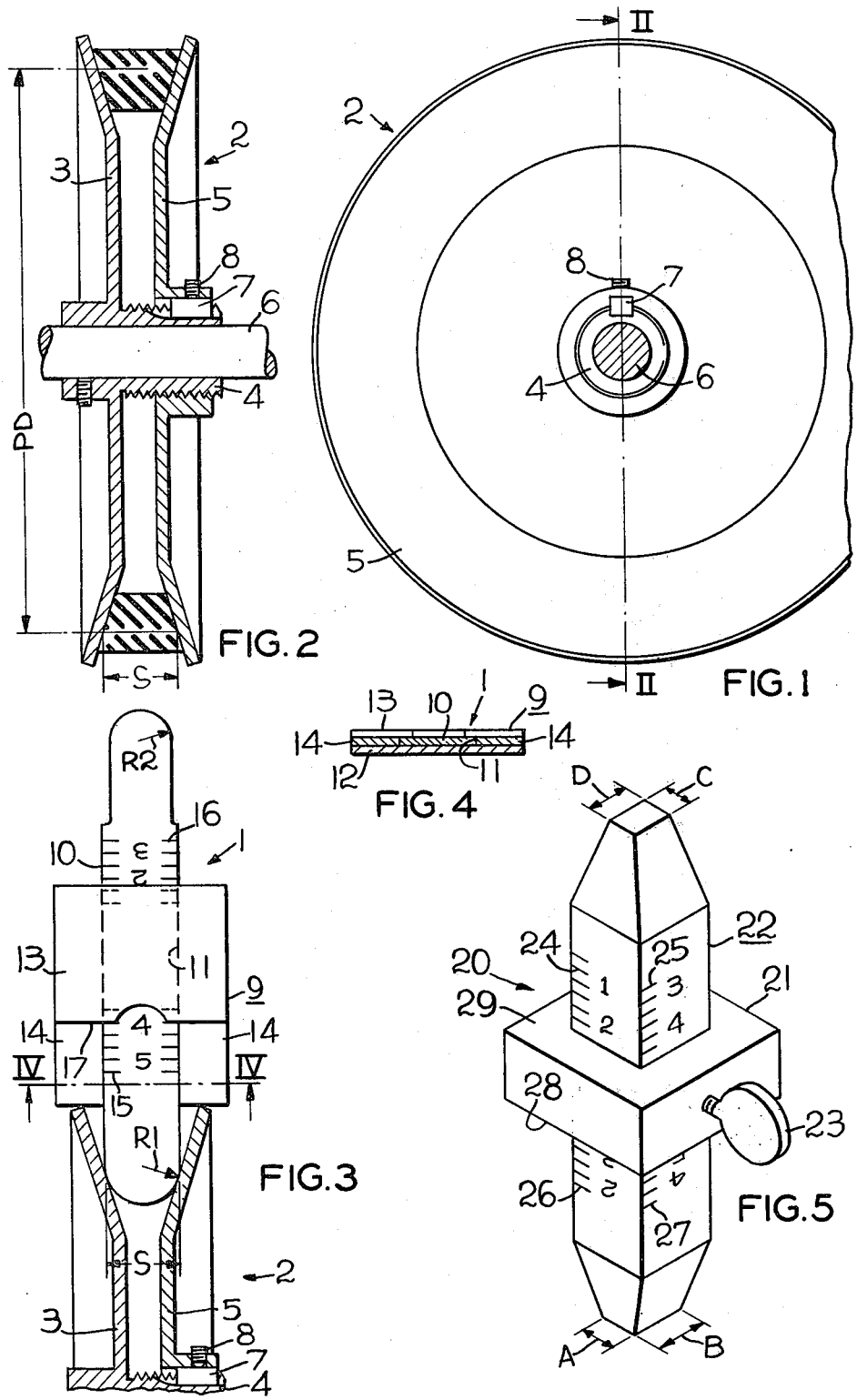

PITCH DIAMETER GAUGE FOR A VARIABLE SPEED PULLEY

BACKGROUND OF THE INVENTION

1. Field of Invention

The present invention relates to measuring gauges and in particular to a gauge for measuring the pitch diameter of a variable speed V-belt pulley.

2. Description of the Prior Art

As shown in FIGS. 1 and 2, a variable speed V-belt pulley typically includes a sheave section 3 having a threaded hub 4 about which an opposing sheave section 5 is threaded to form the track or groove of the pulley. The sheave section 5 is secured in position by a removable key 7 which is slid into a pair of opposing keyways in the hub 4 and the sheave section 5.

In this type of arrangement, the speed ratio of the pulley is adjusted by varying the pitch diameter of the pulley. As indicated by the dimension "PD" in FIG. 2, the pitch diameter is essentially the effective diameter of the pulley which corresponds to the pitch line of the belt where it wraps around the pulley. For example, if the spacing between the opposing sheave sections of the pulley is increased, the pitch diameter will be reduced since the belt will be carried in the groove of the pulley closer to its hub, and conversely, if the spacing between the opposing sheave sections is reduced, the pitch diameter will be increased proportionally.

In order to measure the spacing between the sheave sections in the field, and thus set the pitch diameter of the pulley, it has been the common practice to disassemble the pulley and then reassemble it by rotating the sheave section 5 on the threaded hub 4 a predetermined number of revolutions corresponding to the desired spacing. However, experience has shown this procedure to be time consuming and often difficult to accomplish in the relative confinement of the housings typically used for the heating and air conditioning systems in which this type of pulley is often used.

SUMMARY OF THE INVENTION

The present invention relates to gauges for measuring the widthwise deviation between the walls of a tapered groove and in particular to a gauge for measuring the pitch diameter of a variable speed V-belt pulley.

The gauge includes a body member which can be engaged on the rim of the pulley and a sliding gauge bar carried by the member adapted to be positioned within the groove of the pulley. The gauge bar, which has a scale readable against indicia on the body member calibrated to show the pitch diameter as a function of the extent that the gauge bar projects into the pulley groove, includes at least one end sized to selectively engage the opposing walls of the tapered pulley groove to limit the penetration of the gauge bar into the groove commensurate with the spacing between the opposing sheave sections of the pulley.

When using the gauge to measure the pitch diameter of a pulley, a workman engages the body member on the rim of the pulley while sliding the gauge bar into the groove until the end of the bar abuts the opposing walls of the groove and then reading the pitch diameter on the scale. Conversely, when using the gauge to set the pitch diameter of a variable speed pulley, the workman simply positions the gauge bar within the body member to the desired pitch diameter shown on the scale and adjusts the spacing between the opposing sheave sections until they engage the end of the gauge bar.

Considering the foregoing, it is to be understood that various changes can be made in the arrangement, form and construction of the apparatus disclosed herein without departing from the spirit and scope of the invention.

DESCRIPTION OF THE DRAWINGS

FIG. 1 is a side view of a variable V-belt pulley;

FIG. 2 is a cross-sectional view taken substantially along line II—II in FIG. 1;

FIG. 3 is a partial cross-sectional view similar to FIG. 2 showing the pitch diameter gauge inserted between the sheave sections of the pulley to measure its pitch diameter;

FIG. 4 is a cross-sectional view taken substantially along line IV—IV in FIG. 3; and FIG. 5 is an isometric view of an alternative embodiment of the invention.

DESCRIPTION OF THE PREFERRED EMBODIMENT

Referring to FIGS. 1-4, the pitch diameter gauge 1 is intended to be used to calibrate a variable speed V-belt pulley such as that shown at 2 in the drawings. The pulley 2, which is of a conventional and well known design, includes a sheave or wall section 3 having a threaded hub 4 supporting an opposing sheave or wall section 5 which is threaded on the hub. The hub 4, which is carried on the shaft 6, is secured to the sheave section 5 by a removable key 7 which is slid into a pair of opposing keyways in the hub 4 and sheave section 5. Thereafter, the key is secured in the position shown by a set screw 8 extending through a threaded bore in the sheave section 5.

As discussed above in regard to the prior art, the pitch diameter of a pulley is essentially the diameter which determines its speed ratio. Thus, as shown in FIG. 3, the variable pulley 2 can be set at a particular speed ratio by adjusting the sheave section 5 until the spacing between the opposing sheave sections 3 and 5 corresponds to the pitch diameter set on the gauge 1 projecting into the groove of the pulley.

As shown in FIGS. 3 and 4, the pitch diameter gauge 1 includes a body member 9 and a gauge bar 10 mounted in a sliding press-fit fashion in a slot or channel 11 extending through the member. The body member 9 includes a base plate 12, a cover plate 13, and a pair of parallel spacing plates 14 sandwiched between the base and cover plates 12 and 13 to define the slot 11 extending through the member. The plates are secured together by tack welding or the like to provide a durable yet easily assembled arrangement. As shown in FIG. 3, each end of the gauge bar 1 is cut in an outwardly arcuate semicircular shape sized to tangentially engage the inner faces of the opposing sheave sections. The ends are cut at different radii $R_1$ and $R_2$ associated with the pitch diameter scales 15 and 16, respectively, so that the gauge can be used to set the sheave spacing "S" for pulleys of two different sizes, or alternatively, for adjusting the same pulley to accommodate belts of two different widths.

When using the gauge 1 to set the pitch diameter of the pulley 2, a workman first sets the gauge by aligning the desired scale on the gauge bar with the edge 17 of the cover plate 13. By way of illustration, FIG. 3 shows the gauge set to measure a pitch diameter of 4.0 inches as shown on the scale 15. Once the desired pitch diameter is set on the gauge, the workman simply inserts it into the pulley groove so that the edge of the base plate abuts the outer edges of the sheave sections 3 and 5. Then, while holding the gauge in this position, the workman rotates the sheave section 5 on the threaded hub 4 until both of the sheave sections engage the end of the gauge bar. Thereafter, the sheave section 5 is locked in position by the key 7 secured by the set screw 8.

In the event it is desired to set the pulley at a pitch setting shown on the scale 16 (e.g., 3.0 inches), the workman removes and reverses the gauge bar in the body member to align the scale 16 with the indicating edge 17 of the cover plate 13. Then, the end having the radius $R_2$ is inserted between the sheave sections of the pulley to facilitate its adjustment as discussed above.

The gauge 20 shown in FIG. 5 is an alternative embodiment adapted to measure the pitch diameter of four different sizes of pulleys or of a single pulley which can be adjusted to accommodate up to four different belt widths. As shown in the drawing, the gauge 20 includes a block forming a body member 21, a gauge bar 22 mounted in sliding relation within an aperture in the mounting member, and a thumbscrew 23 secured in a threaded bore in the mounting member adapted to engage the gauge bar to releasably secure it in position. The generally rectangular end portions of the gauge bar 20 have various cross-sectional widths as indicated at "A", "B", "C" and "D" which correspond to the appropriate sheave spacings of four different pulleys, and pitch diameter scales 24, 25, 26 and 27 associated with each width of the end portions, respectively, are inscribed on the gauge bar. The scales A and B are aligned with the surface 28 and the scales C and D are aligned with the surface 29 to indicate pitch diameter settings in the same manner that the scales 15 and 16 are aligned with the edge 17 of the cover plate in the foregoing embodiment.

The gauge 20 is used to adjust the pitch diameter of a pulley in essentially the same fashion as the gauge 1. The gauge 20 is initially set at the desired pitch diameter by positioning the gauge bar within the body member and securing it in position with the thumbscrew 23. The workman then inserts the selected end of the bar into the groove of the pulley so that the block or body member engages the outer edges of the sheave sections. Thereafter, the sheave sections are adjusted until they abut the selected width of the end portion and locked in position as in the first embodiment.

While the gauges embodying the invention are particularly suited for adjusting the pitch diameter of a variable speed pulley, it can be seen that they can be used for measuring the widthwise deviation between the walls of any tapered groove where it is desired to very closely monitor or adjust this dimension. Similarly, while the gauges are preferably made of metal, it can be seen that they can also be made of a thermoplastic or other relatively corrosion resistant material where they are to be used and stored in areas where metals would be more susceptible to corrosion.

The embodiments of the invention in which an exclusive property or privilege is claimed are defined as follows:

1. A gauge for measuring the widthwise deviation between the opposing walls of a tapered groove forming the rim of an adjustable V-belt pulley, comprising:
    a body member including means adapted to be abutably engaged with the outer edges of the walls of the groove;
    a gauge bar slidably mounted within said body member having an end portion of predetermined width;
    indicia on said gauge bar readable against corresponding indicia on said body to express the deviation of said walls as determined by the penetration depth of the gauge bar within the groove upon engagement of the end portion with the opposing walls of the groove;
    said gauge bar having a second end portion of a predetermined width sized to be selectively engaged in a second tapered groove of a different widthwise dimension than said first mentioned groove; and
    second indicia on the gauge bar readable against said indicia on the body to express the deviation of the walls of said second groove as determined by the penetration depth of the gauge bar within said groove upon engagement of the second end portion with the opposing walls of said second groove.

2. The invention according to claim 1, and
    said end portion being of a generally outwardly arcuate configuration having a radius sized to tangentially engage the opposing walls of the groove.

3. The invention according to claim 1, and
    said indicia on the body being spaced from said means engageable with the wall of the groove.

4. The invention according to claim 1, and
    said gauge being of a welded sheet metal construction.

5. The invention according to claim 1, and
    said gauge being formed of thermoplastic material.

6. A gauge for measuring the widthwise deviation between the opposing walls of a tapered groove forming the rim of an adjustable V-belt pulley, comprising:
    a body member including means adapted to be abutably engaged with the outer edges of the walls of the groove;
    a gauge bar slidably mounted within said body member having an end portion of predetermined width;
    indicia on said gauge bar readable against corresponding indicia on said body to express the deviation of said walls as determined by the penetration depth of the gauge bar within the groove upon engagement of the end portion with the opposing walls of the groove;
    said end portion having a predetermined breadth sized to be selectively engaged in a second tapered groove of a different widthwise dimension than said first mentioned groove; and
    corresponding indicia on the gauge bar readable against said indicia on the body to express the deviation of the walls of said second groove as determined by the penetration depth of the gauge bar within said groove upon engagement of the end portion with the opposing walls of said second groove.

* * * * *